(12) United States Patent
Miller (10) Patent No.: US 6,466,961 B1
(45) Date of Patent: Oct. 15, 2002

(54) METHODS FOR ADAPATIVE SPECTRAL, SPATIAL AND TEMPORAL SENSING FOR IMAGING APPLICATIONS

(75) Inventor: David A. B. Miller, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/932,438

(22) Filed: Aug. 16, 2001

Related U.S. Application Data
(60) Provisional application No. 60/226,046, filed on Aug. 16, 2000.

(51) Int. Cl.[7] .............................. G06E 3/00; G06F 7/02
(52) U.S. Cl. ........................................ 708/816; 708/819
(58) Field of Search ................................. 708/816, 819, 708/191, 813, 821; 250/216, 226

(56) References Cited

U.S. PATENT DOCUMENTS

| | | | |
|---|---|---|---|
| 4,514,821 A | 4/1985 | Tower | 364/862 |
| 4,542,367 A | 9/1985 | Shreve | 340/347 |
| 4,556,950 A | 12/1985 | Tai et al. | 364/827 |
| 4,637,056 A | 1/1987 | Sheerman et al. | 382/31 |
| 5,327,370 A | 7/1994 | Brandstetter et al. | 364/822 |
| 5,581,383 A | 12/1996 | Reichel et al. | 349/116 |
| 6,178,020 B1 | 1/2001 | Schultz et al. | 359/107 |

OTHER PUBLICATIONS

Deverse, et al., "Spectrometry and Imaging Using a Digital Micromirror Array," American Laboratory, vol. 30, No. 21, 1998, pp. S112.

*Primary Examiner*—Tan V. Mai
(74) *Attorney, Agent, or Firm*—Lumen Intellectual Property Services, Inc.

(57) ABSTRACT

A method for adaptive spectral sensing developed for a two-dimensional image made up of picture elements. The method calls for illuminating at least one of the picture elements with an input light and deriving a time-varying spectral signal from the input light for that picture element. The time-varying spectral signal is processed with a time-varying reference signal by using a mathematical function such as convolution, multiplication, averaging, integrating, forming an inner product, matched filtering, addition, subtraction or division to obtain a processed output value for the picture element and this output value is then used in determining a spectral characteristic of the input light. The time-varying spectral signal is conveniently derived by optical filtering of the input light yielding an optical time-varying spectral signal. This method can be used by itself or in combination with at least one other adaptive technique such as adaptive spatial sensing and/or adaptive temporal sensing.

23 Claims, 8 Drawing Sheets

FIG. 14 ced
METHODS FOR ADAPATIVE SPECTRAL, SPATIAL AND TEMPORAL SENSING FOR IMAGING APPLICATIONS

RELATED APPLICATIONS

This application is based on provisional patent application No. 60/226,046 filed on Aug. 16, 2000 which is hereby incorporated by reference.

FIELD OF INVENTION

The present invention relates generally to adaptive spectral, spatial and temporal sensing in imaging applications and is especially useful in two-dimensional imaging arrays.

BACKGROUND OF THE INVENTION

Conventional cameras and photographic systems allow limited-colors in images. Color cameras typically collect information in broad spectral bands assigned to each color, and these spectral bands are fixed. There are also imaging systems which operate in spectral bands outside of the visible range, such as in the infrared spectral region. Such imaging systems are very useful in that they enable thermal imaging using the emitted infrared radiation from warm bodies, for example, and specific spectral bands in the infrared also allow identification of chemicals and materials. More specific identification is possible if narrow spectral bands are used, or if specific collections of spectral bands are used that are well chosen to discriminate between different chemicals or materials. Such discrimination can be very useful in identifying targets, tracking biological and chemical agents, finding materials, locating plants and in tracking various other materials and objects in the environment.

Hyperspectral imaging attempts to collect image data at a very large number of colors or in many different spectral bands. This technique generates very large amounts of data that is difficult to process. An alternative approach is to make a system that collects a few specific wavelengths using fixed filters in front of detector elements. Such a system can detect specific kinds of objects with specific emission, reflection or absorption spectra. However, this type of system is typically only usable for the specific objects it is designed to detect.

Another approach uses a kind of adaptive spectrometer, as discussed by Deverse at al., "Spectrometry and Imaging Using a Digital Micromirror Array", American Laboratory, Vol. 30, No. 21, 1998, pp. S112. This approach allows the optimum spectral response to be chosen to discriminate objects. This system is based on the use of micromirror arrays and can provide choice of spectral sensitivity at least for a linear array of light spots or picture elements. Unfortunately, it is more difficult to use this technique for controlled spectral sensitivity in a two-dimensional image.

What is required is adaptive spectral sensing which is easy to implement for two-dimensional arrays of picture elements. It would also an advance to provide for additional adaptive sensing capabilities, such as adaptive spatial sensing and adaptive temporal sensing.

OBJECTS AND ADVANTAGES

Accordingly, it is a primary object of the present invention to provide for efficient adaptive spectral sensing in two-dimensional arrays of picture elements.

It is another object to provide for efficient adaptive spatial and temporal sensing in two-dimensional arrays of picture elements.

These and other objects and advantages will become apparent upon reading the ensuing description.

SUMMARY OF THE INVENTION

The objects and advantages set forth are achieved by a method for adaptive spectral sensing developed for a two-dimensional image made up of picture elements. The method calls for illuminating at least one of the picture elements with an input light, e.g., light from an object to be examined, and deriving a time-varying spectral signal from the input light for that picture element. Next, the time-varying spectral signal is processed with a time-varying reference signal to obtain a processed output value for the picture element. The output value is then employed for determining a spectral characteristic of the input light. The spectral and reference signals are processed by applying to them a mathematical operation such as convolution, multiplication, averaging, integrating, forming an inner product, matched filtering, addition, subtraction and division.

The time-varying spectral signal is conveniently derived by optical filtering of the input light yielding an optical time-varying spectral signal. The optical filtering can be performed by an optical filter positioned in front of the picture element. In one embodiment, the optical filter is a scanning optical filter and the optical filtering function is performed by scanning. In another embodiment, the optical filter is a Fourier transform scanning optical filter and the optical filtering function involves performing a Fourier transform. The optical filtering can also be combined with other operations, e.g., optically splitting the input light.

Alternatively, the time-varying spectral signal is derived from electrically controlling a spectral detector element.

The spectral detector element can be any suitable photodetector such as a quantum well infrared photodetector, a silicon photodetector or an analog electronic multiplier. In the process of electrically controlling the photodetector the derived time-varying spectral signal can be an electrical time-varying spectral signal such as a voltage, a current, an inductance, a power, an electric field, a magnetic field, a resistance, a capacitance or an inductance. The time-varying reference signal with which the electrical time-varying spectral signal is processed is also in the electrical form; i.e., it is an electrical time-varying reference signal.

In a preferred embodiment, the two-dimensional image of picture elements is formed of an array of pixels. In other words, the picture elements of the image correspond to a number of pixels. It is also convenient that in this embodiment time-varying spectral signals be derived for each of the pixels. The time-varying reference signals used in this derivation can be different for different pixels.

The technique for adaptive spectral sensing can be implemented independently or together with at least one other adaptive sensing technique such as adaptive spatial sensing and adaptive temporal sensing.

The specific embodiments of the invention are described in the detailed description with reference to the attached drawing figures.

DETAILED DESCRIPTION

Figure 1:
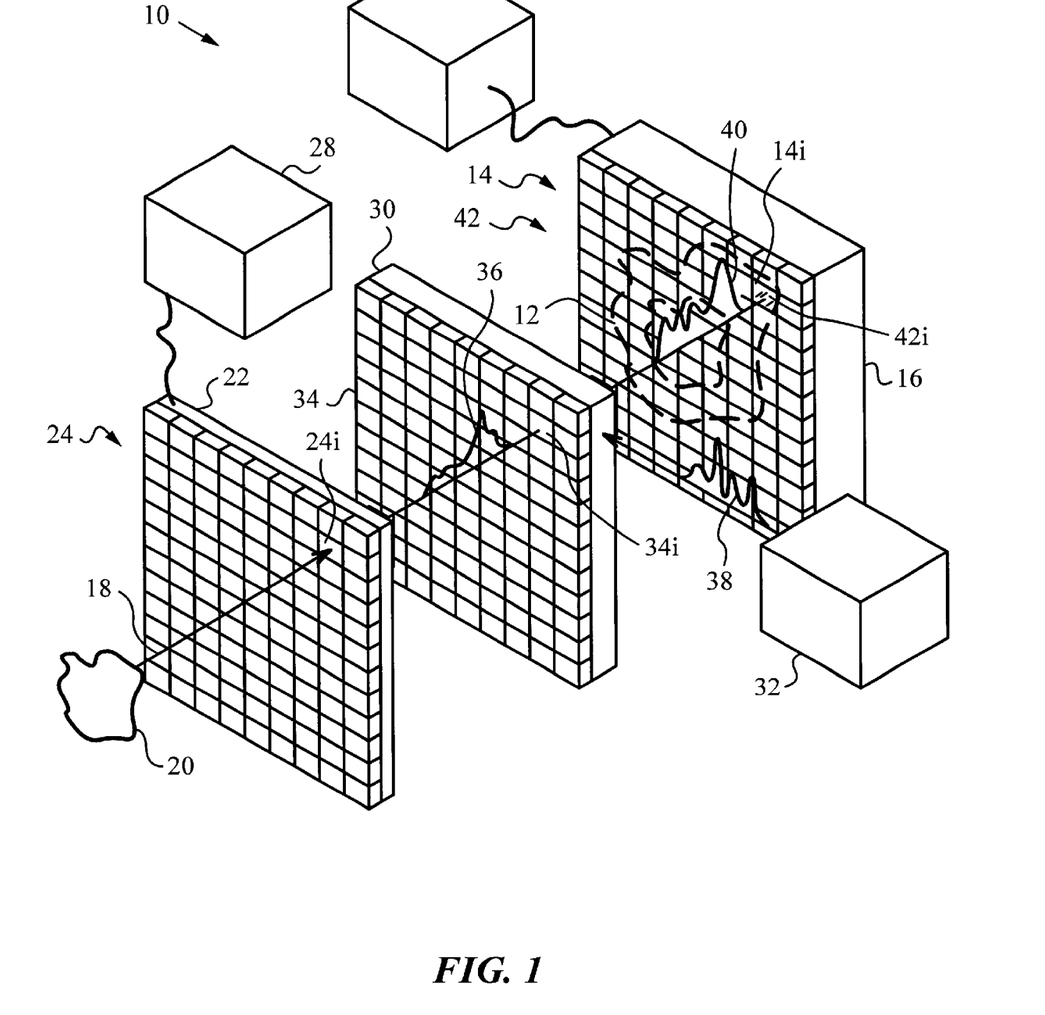
FIG. 1 is an exploded isometric view illustrating the general principles of an adaptive spectral sensing system according to the invention.

The principles and operation of the invention will be best understood by first examining an adaptive spectral sensing system 10 as illustrated in an exploded isometric view in FIG. 1. System 10 is designed to produce a two-dimensional image 12 from an input light 18 originating from an object 20 which is being studied. Input light 18 is typically visible or infrared light emitted, transmitted or reflected by object 20. Image 12 is formed from input light 18 projected on picture elements 14 which are arranged in a two-dimensional array. It is understood that beam shaping optics such as lenses, apertures and any other elements (not shown) can be used for projecting input light 18 on picture elements 14.

Preferably, picture elements 14 are pixels of a two-dimensional imaging device 16. Pixels 14 are equipped with spectral detector elements 42 responsive to input light 18. Elements 42 are responsible for converting signals derived from input light 18 into electrical signals. Elements 42 are preferably photodetectors such as quantum well infrared photodetectors, silicon photodetectors or analog electronic multipliers. A person skilled in the art will recognize that the choice of elements 42 will depend on many parameters of system 10 as well as the spectral range of input light 18 and its intensity level. The knowledge in making the choice of elements 42 is within the knowledge, of a person skilled in the art. Imaging device 16 is operated by a control unit 26 containing circuitry for addressing, monitoring and processing information from pixels 14. Control unit 26 also has a time averaging circuit for deriving a processed, time-averaged value from a time-varying signal.

System 10 is equipped with an optical filter 22 positioned in front of imaging device 16 for optically filtering input light 18 to derive time-varying spectral signals for pixels 14. In this embodiment optical filter 22 is actually a two-dimensional array of a number of optical filters or filter elements 24, corresponding one-to-one to pixels 14 of imaging device 16. Filtering elements 24 are scanning optical filters, specifically scanning Fabry-Perot interferometers consisting of two parallel partially-reflecting plates (not shown) whose separation is varied in performing the optical scan. In an alternative embodiment where the scan for each element 24 can be the same, a single scanning Fabry-Perot interferometer can replace independent elements 24. In another alternative embodiment, filtering elements 24 are Fourier transform scanning optical filters and their optical filtering function involves performing a Fourier transform on input light 18. In fact, any optical filtering elements 24 which can produce time-varying spectral signals can be employed by optical filter 22.

A control unit 28 appropriate for the type of elements 24 chosen is provided for operating optical filter 22. In the present embodiment control unit 28 controls the scanning operation of Fabry-Perot interferometers 24 by altering the distance between their partially-reflecting plates.

Optical filter 22 is followed by a processing unit or a modulator 30 positioned before imaging device 16 and driven by a reference unit 32. In this embodiment modulator 30 is a two-dimensional array of modulation elements 34. Reference unit 32 is designed to deliver time-varying reference signals to modulation elements 34. Modulation elements 34 process the time-varying spectral signals with the time-varying reference signals to obtain time-varying processed signals. In the present embodiment modulation elements 34 are multipliers designed to multiply time-varying spectral signals by time-varying reference signals to obtain the time-varying processed signals. More specifically, modulation elements 34 are optical transmission modulators operating in response to time-varying reference signals. In alternative embodiments, modulation elements 34 can perform other mathematical functions such as convolution, averaging, integrating, forming an inner product, matched filtering, addition, subtraction and division to derive the time-varying processed signals.

There are various ways in which modulator 30 can be made, with the preferred method depending on the wavelength range on interest and the speed of operation desired. More specifically, when input light 18 in the visible range is of interest, modulator 30 can be liquid crystal device. Another kind of modulator 30 can be one based on electro-optic effects. A person skilled in the art will appreciate how to implement suitable modulation elements to perform any of the desired mathematical functions within the wavelength range of interest.

The operation of system 10 will be better understood by referring to a particular scanning Fabry-Perot interferometer 24i associated with pixel 14i of image 12. Input light 18 originating from object 20 arrives at interferometer 24i while control unit 28 scans the interferometer 24i by changing the distance between the interferometer's 24i plates. In performing this scan interferometer 24i derives from input light 18 a time-varying spectral signal 36.

Time-varying spectral signal 36 is incident on modulator 30, and specifically on optical transmission modulator 34i. Reference unit 32 driving modulator 30 delivers a time-varying reference signal 38 to optical transmission modulator 34i. Time-varying reference signal 38 is an optical signal and it affects the transmission of modulator 34i in such a manner, that modulator 34i multiplies time-varying spectral signal 36 with the time-varying reference signal 38. The product of this multiplication is a time-varying processed signal 40. Processed signal 40 is also an optical signal.

Time-varying processed signal 40 continues to propagate to imaging device 16, where it is incident on pixel 14i. Pixel 14i has photodetector 42i which converts time-varying processed signal 40 from its optical form to an electrical time-varying processed signal. Preferably, the electrical time-varying processed signal is substantially proportional to incident optical power in time-varying signal 40.

Control unit 26 employs its circuitry to collect the electrical time-varying processed signal. Then, control unit 26 uses its time averaging circuit to time average the electrical time-varying processed signal and thus derives a processed output value for pixel 14i. The output value in this case is an average value. Alternatively, control unit 26 has an integrating circuit for integrating the electrical time-varying processed signal. The output value in this case is a sum value. A person skilled in the art will recognize that the time averaging function could also be resident in modulator 30 or that a separate unit could be provided for time averaging time-varying processed signal 40.

The output value for pixel 14i is employed for determining a spectral characteristic of input light 18. For example, the output value is used to determine the spectral content of input light 18 to derive information about object 20. The information about the spectral content of light 18 can also be used to adjust the spectral sensitivity of system 10, e.g., to adjust and/or compensate the circuitry of control unit 26. In fact, the spectral characteristics obtained from output value can be used for studying any aspects of object 20, e.g., its chemical composition or biological characteristics, or to adjust any spectrum-related operational aspect of system 10.

Figure 2A:
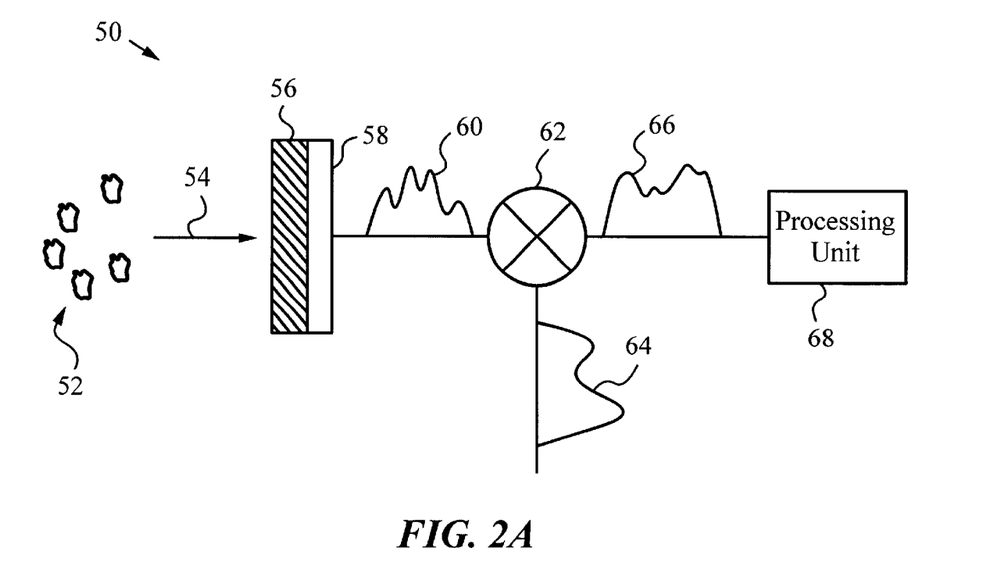
FIG. 2A is a schematic diagram of a portion of an alternative adaptive spectral sensing system.

The manner in which system 10 produces and processes optical time-varying spectral signal 36 can be altered in many ways. The schematic diagram in FIG. 2A illustrates a portion of an alternative system 50 for processing an input light 52 from a collection of objects 54. In system 50 a tunable spectral detector element 56 is illuminated by input light 52. A control circuit 58 electrically controls detector element 56 by varying its spectral sensitivity. in time such that element 56 converts input light 52 to an electrical time-varying spectral signal 60. Detector element 56 can be any suitable photodetector element, e.g., a quantum. well infrared photodetector for infrared applications, a silicon photodetector or an analog electronic multiplier. A person skilled in the art will recognize that the choice of element 56 will depend on many parameters of system 50 as well as the spectral range of input light 52 and its intensity level.

Control circuit 58 can electrically control element 56 in many different ways. Depending on the control method selected, electrical time-varying spectral signal 60 which is derived can be a voltage, a current, an inductance, a power, an electric field, a magnetic field, a resistance, a capacitance or an inductance. A person skilled in the art will appreciate what type of electrical circuitry is required of control circuit 58 to produce any of the above types of electrical time-varying spectral signal 60.

A modulator 62, in this case a mixer, receives electrical time-varying spectral signal 60 and processes it with an electrical time-varying reference signal 64. The processing can include multiplication, convolution, averaging, integrating, forming an inner product, matched filtering, addition, subtraction or division. The result of the processing is an electrical time-varying processed signal 66. A processing unit 68 receives electrical time-varying processed signal 66 and time averages it (or integrates it) to obtain a processed value associated with a picture element (not shown) of system 50.

System 50 thus relies on electrical processing to derive the processed value rather than on optical processing, as does system 10. This approach is convenient in for some applications, especially where extensive electrical signal processing capabilities are already present.

Figure 2B:
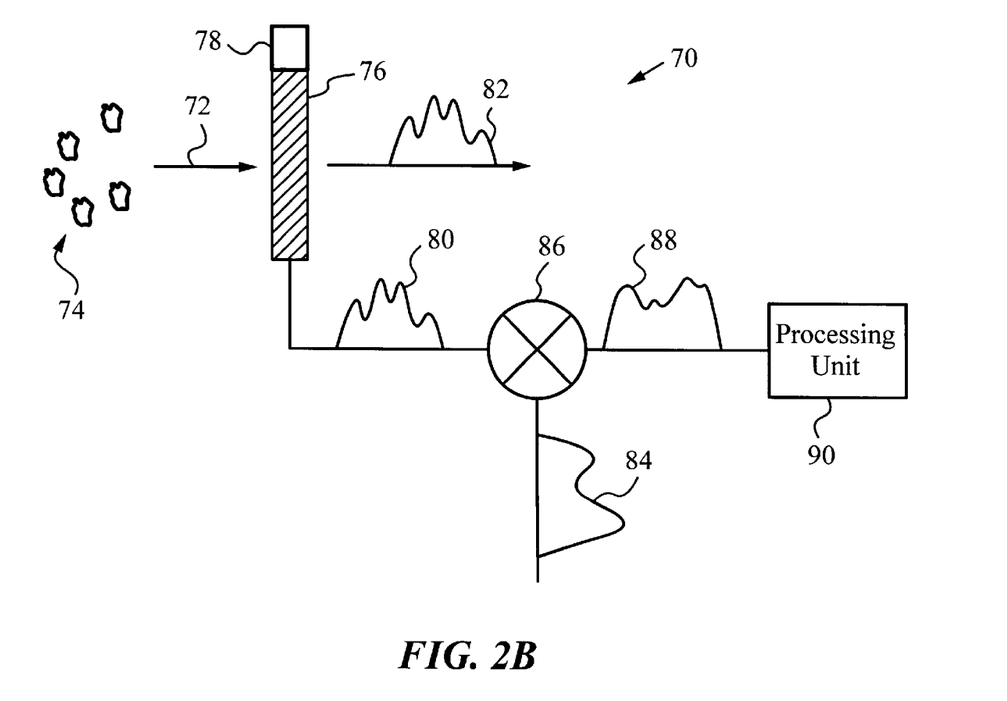
FIG. 2B is a schematic diagram of a portion of still another alternative adaptive spectral sensing system.

FIG. 2B illustrates a portion of another alternative system 70 for processing an input light 72 from a collection of objects 74. In system 70 a scanning optical filter 76 is illuminated by input light 72. A control circuit 78 controls or scans optical filter 76 such that optical filter produces an optical time-varying spectral signal 80. At the same time, an electrical time-varying spectral signal 82 is also produced.

System 70 processes electrical time-varying spectral signal 80 with an electrical time-varying reference signal 84 in a modulator 86 to derive an electrical time-varying processed signal 88. A processing unit 90 then obtains the processed value associated with the corresponding picture element by time averaging or integration.

In any of the above systems it is understood that the spectral sensitivity could be set the same for every picture element or pixel if desired. This would be done by feeding the same time-varying reference signal for each pixel. Alternatively, the spectral sensitivity could be set to differ from pixel to pixel, if desired, by feeding different time-varying reference signals for different pixels. It is also understood that the same pixel can have several different spectral filtering operations performed on it to generate multiple different spectral sensitivities, just as a conventional color camera returns values for each of three different colors in each pixel.

Several different spectral filtering operations can be achieved, for example, by optically splitting the input light before the scanning filter onto multiple separate systems, each configured for one kind of spectral response. Alternatively, the optical time-varying spectral signals can be optically split after the scanning optical filter into multiple copies of the optical time-varying spectral signals. The copies are then processed separately with different time-varying reference signals. Appropriate beam splitting techniques to split the input light or obtain multiple copies of the optical time-varying spectral signal are well-known in the art. When operating in the electrical domain, the electrical time-varying spectral signals can be processed with different electrical time-varying reference signals and separately time averaging or integrating each result to generate multiple different electrical processed output values. Yet another solution available in the electrical domain is to operated with multiple different electrical time-varying reference signals one after the other in sequence to generate a sequence of different electrical processed output values, each corresponding to a different spectral filtering of the corresponding picture element or pixel.

It will also be clear to a person skilled in the art based on the above-described embodiments, that various functions such as multiplication and time-averaging or multiplication and conversion between optical and electrical signals can be combined in one system or circuit if that is more convenient than separating these functions. It is also possible to perform some or all of the optical filtering and processing functions by one device on all pixels at once. In system 10 of FIG. 1 this could be done by replacing optical filter 22 having a number of individual Fabry-Perot interferometers 24 with a single Fabry-Perot interferometer intercepting input light 18 propagating to all pixels 14.

Figure 3:
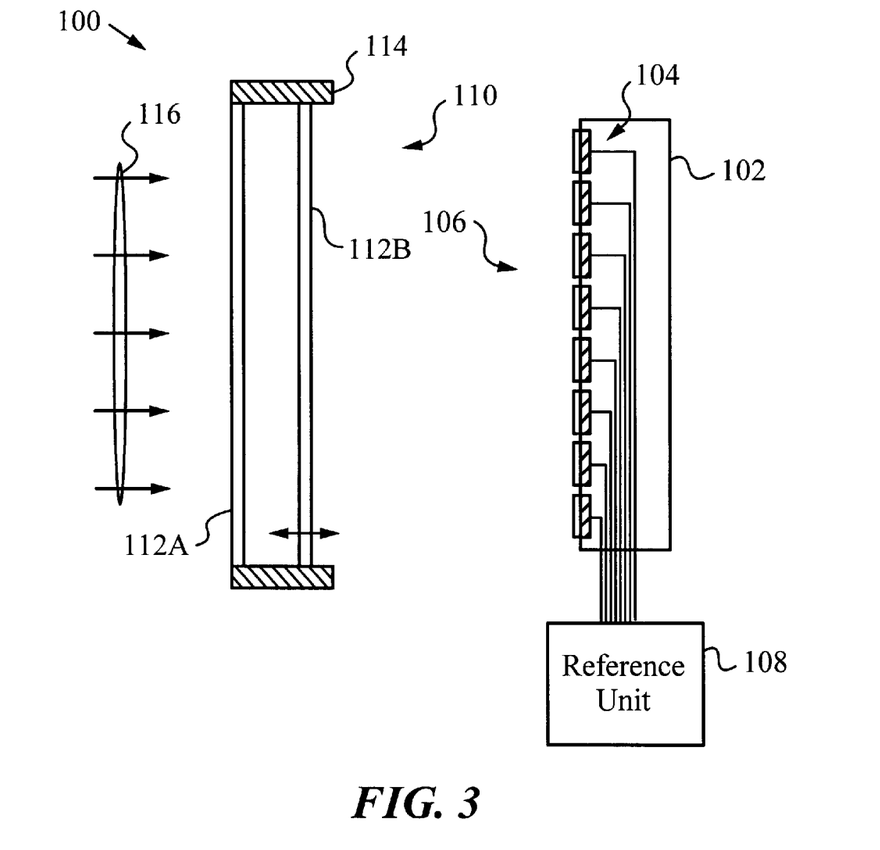
FIG. 3 illustrates a plan side view of another adaptive spectral sensing system.

FIG. 3 illustrates an adaptive spectral sensing system 100 employing an imaging unit 102 with an array of photoconductive detectors 104. Photoconductive detectors 104 serve the function of spectral detector elements for corresponding pixels 106. Photoconductive detectors 104 are electrically connected to a reference unit 108. Reference unit 108 is designed to apply electrical time-varying reference signals to photoconductive detectors 104.

System 100 has a scanning optical filter 110 having two semi-transparent plates 112A, 112B. Filter 110 has a mechanism 114 for varying the separation between plates 112A, 112B to perform an optical scan.

During operation, an input light 116 is admitted into filter 110 and filter 110 generates optical time-varying spectral signals (not shown) during its scan. After exiting filter 110, optical time-varying spectral signals are incident on pixels 106 and are detected by corresponding photoconductive detectors 104. Now, reference unit 108 applies electrical time-varying reference signals to photoconductive detectors 104. Under these circumstances, photoconductive detectors 104 are driven by a voltage in response to the time-varying reference signals, and the time-averaged current from each photodetector represents the electrical multiplied time-varying signal. In a simple photoconductor, over a useful operating range, the output current is proportional to the voltage applied to the photoconductor as well as to the intensity of input light 116. Hence, the output current from each of photodetectors 104 is the product of the power of input light 116 or the time-varying spectral signal and time-varying reference signal for that photodetector 104 (or corresponding pixel 106). Therefore, system 100 does not require a modulator for performing the multiplication of the time-varying spectral and reference signals.

Figure 4:
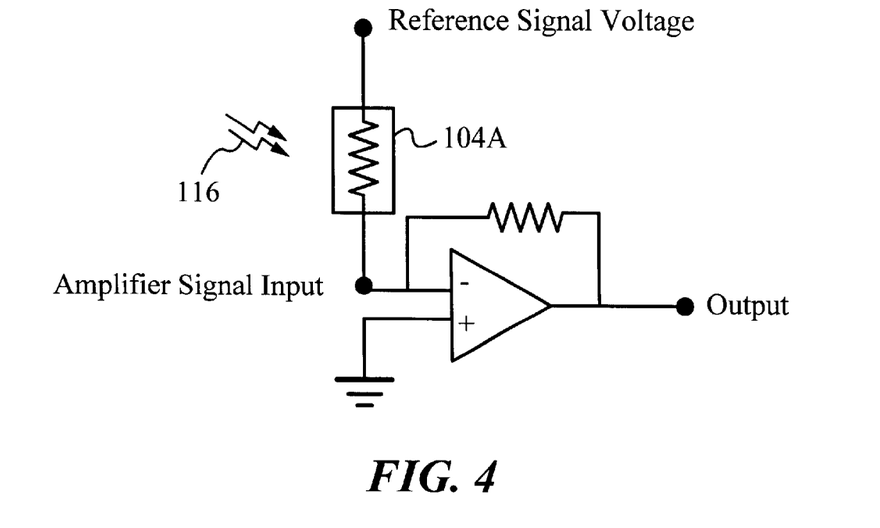
FIG. 4 is a circuit diagram showing a photoconductive detector of the system shown in FIG. 3.

FIG. 4 illustrates the electrical connections for an exemplary photoconductive detector 104A to operate as one of detectors 104 in system 100. In this case photoconductor 104A is connected both to the time-varying reference signal, here expressed as a voltage, and to an amplifier designed for current input. The amplifier is shown as an operational amplifier in a conventional configuration with a feedback resistor for operation as a transimpedance amplifier; such an amplifier has low input impedance so that the amplifier signal input appears as a virtual ground. Other forms of amplifiers having similar desirable attributes are well known to those of ordinary skill in the art. Note that this approach allows the use of both positive and negative reference signals in the multiplication process, resulting in both positive and negative current signals from photoconductive detector 104A. This positive and negative multiplication is a desirable characteristic since it allows the cancellation of undesired signals.

It should also be noted that photoconductive detectors can be made with many different kinds of materials, including semiconductors such as silicon, gallium arsenide, indium gallium arsenide, indium phosphate, lead sulfide, lead selenide, lead tin telluride, indium antimonide, mercury cadmium telluride, and in general with most known semiconductor materials, as is well known to those of ordinary skill in the art. The specific material choices will depend on the portion of the spectrum of interest in input light 116 as well as other parameters of system 100. It should also be noted, that bolometer detectors can be substituted for photoconductive detectors 104 in system 100. That is because bolometer detectors produce a change in resistance in response to absorbed optical power and can thus also process the time-varying spectral and reference signals.

Figure 5:
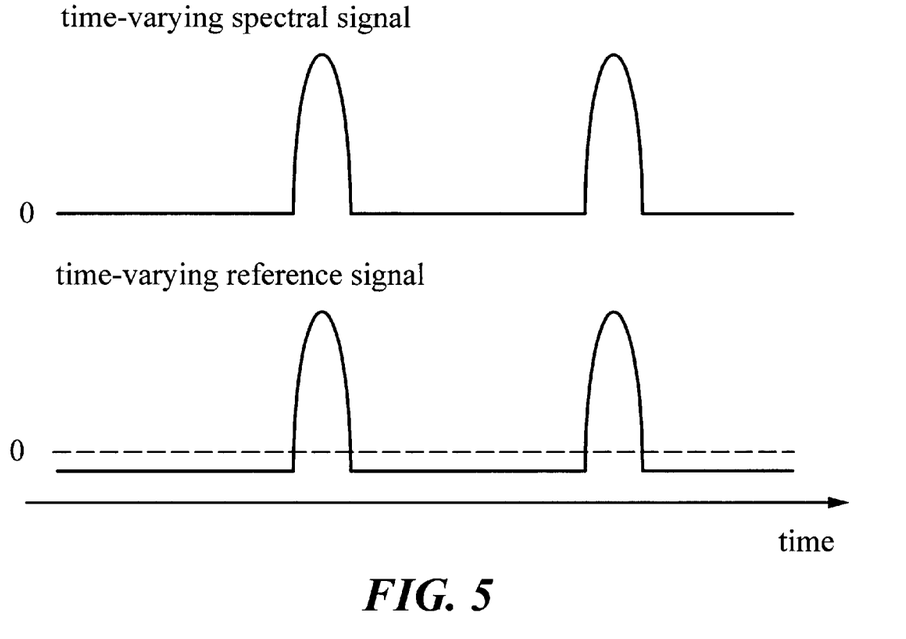
FIG. 5 is a timing diagram illustrating an example of an optical time-varying spectral optical signal from the scanning optical filter from an object of interest, and a corresponding time-varying reference signal.

FIG. 5 is a simple example of an optical time-varying spectral signal from the scanning optical filter from an object of interest, and a corresponding time-varying reference signal. When the scanning optical filter is a simple spectral filter such as a Fabry-Perot filter, the signal shown would correspond to the optical spectrum from the object of interest consisting of two spectral bands. The corresponding reference signal in this example is of similar form to the example optical time-varying spectral signal, except that it is somewhat negative in spectral regions outside the spectral bands of interest (see zero point). In this example, this negative value is chosen so that, when a uniform spectrum is presented to the input of the system (instead of the optical signal form the objects of interest), the time-integrated or time-averaged result of the multiplication by the time-varying reference signal is zero. Hence, in this example, the desired signal is detected and a uniform spectral signal (e.g., background noise) is rejected. Other forms of time-varying reference signal can also be used to reject other forms of undesired input spectrum while preserving sensitivity to the object of interest.

One simple mode of operation of the system is to scan the scanning optical filter repetitively. In such a mode, the desired processed output value can be obtained by simple time-averaging of the multiplied time-varying signal. Note that it is not necessary that the rate of scanning be constant, or even that it be unidirectional; appropriate choice of the reference signal can compensate for any such scanning function.

One simple method of constructing a time-varying reference signal to correspond to a particular spectrum produced by from an object of interest is to use such a source as the input to the system and to record the optical time-varying spectral signal as a function of time. This can be done, for example, by detecting the optical signal to construct an electrical signal and recording the electrical signal as the scanning optical filter is scanned through a complete cycle. The resulting time-varying signal can then have a constant added to it so that it has zero net integrated area. This signal can then be used as a time-varying reference signal that detects the spectrum of interest while suppressing a uniform spectral background (noise) Such a method also automatically compensates for finite temporal response in the detector itself. It will be understood by a person skilled in the art that other methods of constructing time-varying references signals can be more appropriate, depending on the application, system and other parameters.

It should also be understood that it is not necessary that the multiplication by the reference signal correspond exactly to a standard arithmetic multiplication. The multiplication process can be nonlinear, with the result depending in a nonlinear fashion on the amplitude of the time-varying reference signal. Such nonlinearity can be compensated by an appropriate change in the time-varying reference signal.

Figure 6:
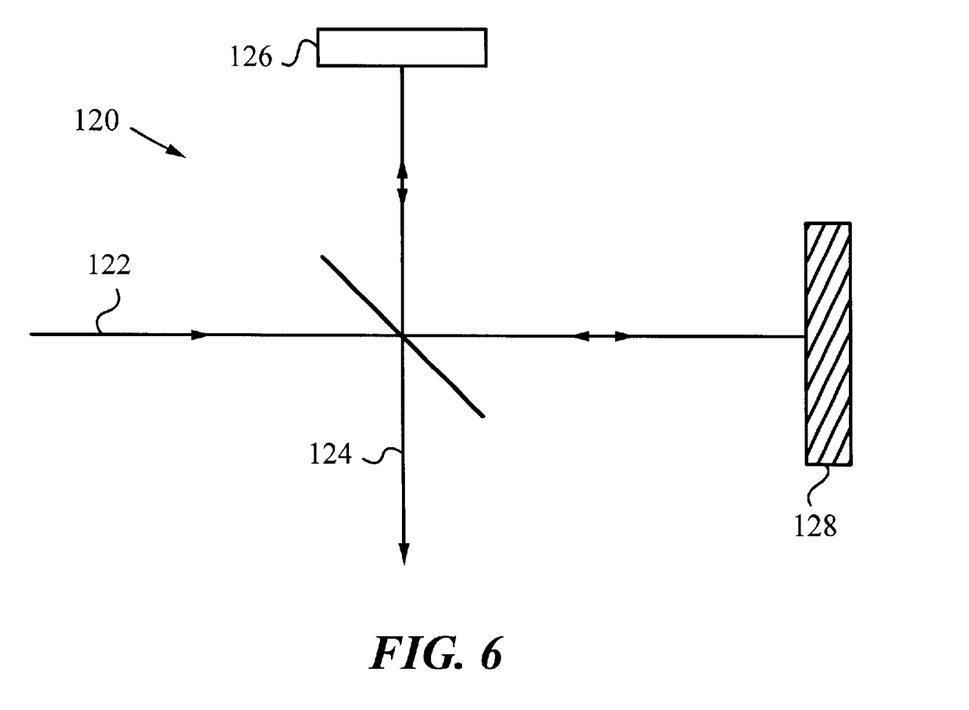
FIG. 6 is a diagram of a Fourier transform scanning optical filter.

An alternative approach to a scanning optical filter is. to use the method known as Fourier transform spectroscopy. One simple version of such a Fourier transform scanning optical filter 120 is shown in FIG. 6. Filter 120 can be substituted for Fabry-Perot interferometers 24 used in system 10. Filter 120 has an output 124 and an input 122, which do not have to be collinear in this filter. Either one large filter 120 could be used for all the spectral detector elements 42 or one small filter 120 could be used for each individual detector. The output 124 from filter 120 is not a simple spectrum of input 122, but rather it is essentially the Fourier transform of the spectrum of input 122. However, the use of the Fourier transform does not essentially change the operation of system 10. The time-varying reference signal required will be different when Fourier transform scanning optical filter 120 is used. In fact, the reference signal required is essentially related to the Fourier transform of the spectrum of interest in input light 18, as is well-known to those ordinarily skilled in the art. Note that many other forms of two-beam interferometers exist that could also be used to generate Fourier transform scanning optical filters, as is well-known to those skilled in the art. Yet another scheme of making a scanning optical filter is to use the Hadamard transform technique discussed by R. A. Deverse, R. M. Hammaker, W. G. Fateley, J. A Graham, J. D. Tate, in "Spectrometry And Imaging Using A Digital Micromirror Array," American Laboratory Vol. 30, No. 22, 1998, pp. S112 et seq. The techniques discussed therein can be used to generate a time varying optical spectral signal by the action of controlled mirrors selectively partitioning the detected spectrum of light in a time-varying manner.

For any of the systems described herein the preferred mode of operation is at an output rate corresponding to the frame rate of a typical imaging system, which could be in the range of 30 frames per second. Each frame time (1/30 of a second in this illustrative example) would therefore preferentially correspond to one or more cycles of the scanning optical filter so that the signal for each pixel in the image would be a sufficiently averaged result of the process of spectral filtering and multiplying by the reference signal. Such a cycle time for a scanning filter is readily obtained by vibrating bodies, for example. Operation at cycle times much faster than 1/30 of a second is also readily feasible with many vibrating devices. One example of a device capable of vibrating at such frequencies is a loudspeaker cone. Interferometers similar to the Fourier transform scanning optical filter 120 are frequently made by mounting a mirror on a loudspeaker cone and driving the loudspeaker with an appropriate oscillating electrical signal. (Such interferometers are frequently used as part of autocorrelators for measuring optical signals.) Sometimes rotating glass plates can be inserted in an arm of the interferometer instead of moving the mirror itself, as is well known to those skilled in the art. A preferred way of driving the vibrating or rotating body in the scanning optical filter would be to drive it from a scanning signal derived from the same circuit as that generating the reference signal, so that both the scanning signal and the reference signal would be synchronized.

Methods for generating a time-varying reference signal are well known to those skilled in the art. Such a signal can for example, be stored as a set of numbers in a digital processor, and converted to an analog signal (such as an electrical voltage) by sequentially reading out the numbers into an analog-to-digital converter.

It is not necessary that scanning spectral filter scan the spectrum in a linear fashion or measure each spectral region with equal accuracy. For some applications, such as a situation where the spectral information of interest is concentrated in a few small spectral areas, it would be preferable to have the filter scan more slowly through the spectral region of greater interest. Hence the spectral scanning itself can be adapted to suit the problem of interest, as well as choosing the time-varying reference signal appropriately. A person skilled in the art will recognize that it can also be useful to have a Fabry-Perot filter of adjustable finesse, for focusing in on these regions of interest.

Figure 7:
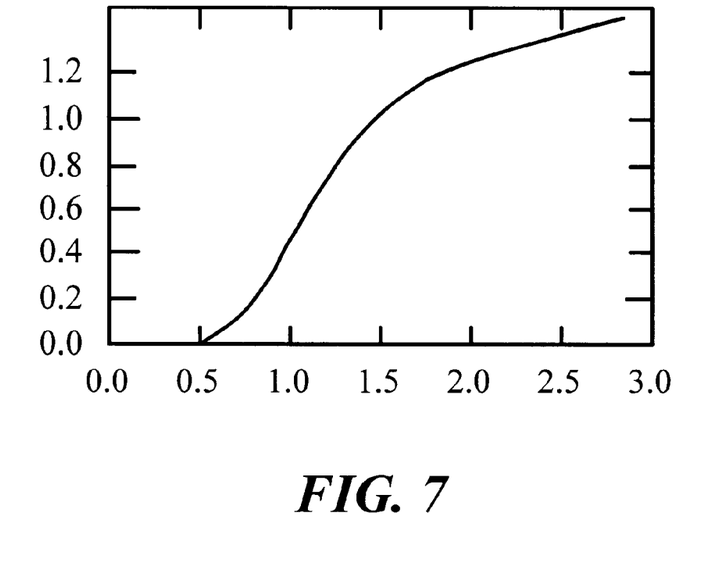
FIG. 7 is a graph of responsivity (photocurrent per unit optical power) of a quantum well infrared photodetector at a temperature of 77 K as a function of bias voltage.

One convenient choice of photodetector for operation in the infrared wavelength range is the quantum well infrared photodetector (QWIP). QWIPs are photoconductive detectors, and hence are well suited for use with the system of invention. For example, in the region between 0.5 Volt and 1.5 Volt bias, the photocurrent for a given optical power increases smoothly in the example results indicated in the graph of FIG. 7. These results are further described in the article "Semiconductor heterostructures: a quantum Lego for the infrared," by E. Rosenher in *Semiconductor quantum optoelectronics*, eds. A. Miller, M. Ebrahimzadeh, and D. M. Finlayson (Institute of Physics, Bristol, 1999), pp 367–390. In this case, it is advantageous to prebias the photoconductive detector with approximately a 0.5 Volt bias. Alternatively, the reference signal could be appropriately changed to account for the bias range in which there was little responsivity of the detector, by adding approximately 0.5 V of bias when the reference signal is positive, and adding approximately −0.5 V of bias when the reference signal is negative.

Silicon is useful as a photodetector for use in systems of the present invention from the near infrared to the ultraviolet. Its use as an ultraviolet detector is discussed by M. Razeghi and A. Rogalski, "Semiconductor Ultraviolet Detectors," J. Appl. Phys. 79, 7433–7473 (1996). Ultraviolet detectors can be particularly effective for identifying biological materials. Silicon is extensively used in CCD (charge-coupled devices) cameras in the visible range, and silicon detectors are also used in the more recent CMOS cameras that use processing compatible with silicon CMOS integrated circuits (see, e.g., M. J. Loinaz, K. J. Singh., A. J. Blanksby, D. A. Inglis, K. Azadet, and B. D. Ackland, "A 200-mW, 3.3-V, CMOS Color Camera IC Producing 352× 288 24-b Video at 30 Frame/s," IEEE J. Solid-State Circuits, 33, 2092–2103 (1998)). Such photodetectors can be used with circuits well known to those skilled in the art to produce currents or voltages in response to input light.

It is also possible to make silicon photodetectors whose output signal varies in response to an electrical control signal. One way to do this is to vary the depletion length, and hence vary the photocurrent collection efficiency, hence allowing a multiplication of the input signal by a reference signal. It is possible to make a silicon photoconductor by using a field-effect transistor channel as the photoconductor, with one end of the channel connected to a low impedance preamplifier (to amplify the detected current signal), and the other end to the reference signal. The number of carriers in the channel would depend on the number of carriers (electrons and/or holes) generated by optical absorption at or near the channel region. The electrical current signal collected would tend to be proportional to the number of such carriers and to the reference voltage signal.

Figure 8:
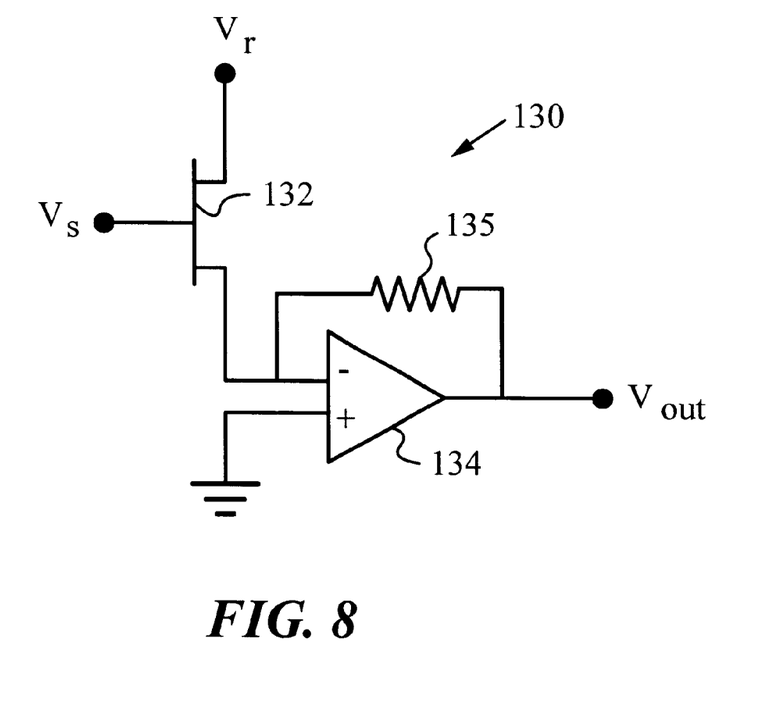
FIG. 8 is a circuit diagram of a simple multiplier circuit.

There are many circuits capable of multiplying two electrical signals. In the present invention, the two signals of interest are the time-varying reference signal and a voltage or current signal output from a photodetector corresponding to the time-varying spectral signal. One very simple form of multiplier circuit 130 to multiply these two signals is shown in FIG. 8. In circuit 130 an NMOS transistor 132 behaves as a resistor whose value is controlled by the signal voltage $V_s$. This signal voltage $V_s$ is derived from the photodetector signal, and may have a bias voltage added to it (in addition to the detector signal) to bring NMOS transistor 132 into a useful operating range. Transistor 132 is connected to a reference signal voltage $V_r$ at one end and to the "virtual ground" input of an amplifier 134 at the other. The current flows through a resistor 135 into amplifier 134 and the input is therefore approximately proportional to the product of the photodetector signal and the reference signal. An output voltage, $V_{out}$ is proportional to amplifier 134 input current and hence to the desired product. Circuit 130 can operate with reference signals of either polarity over a useful operating range of voltages. For analog multiplier circuits compatible with CMOS processing the reader is referred to the article by G. Han and E, Sanchez-Sinencio, "CMOS Transconductance Multipliers: A Tutorial," IEEE Trans. Circuits and Systems-II: Analog and Digital Signal Processing, 45, 1550–1563 (1998).

Any system of the invention can be adapted for sequential processing of different spectral signals. By changing the reference signal in successive periods of the scan of the spectral filter, successive different output values will correspond to different spectral filterings, allowing multiple such filterings to be performed by the one detector element.

The same basic kind of approach taken above for adaptive spectral sensing and processing is also applied to adaptive sensing and processing in the spatial domain, and in the time domain.

Adaptive Spatial Processing

Figure 9:
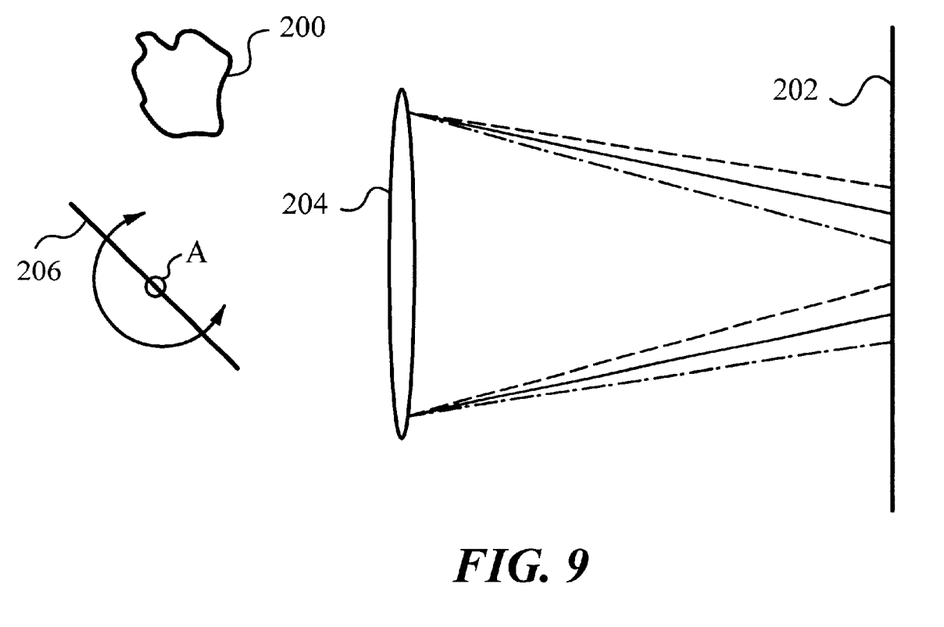
FIG. 9 is a diagram illustrating the imaging of an object for adaptive spatial processing.

The underlying concept here is to scan the image over the detectors, weighting different parts of the scan differently in averaging the resulting output from the detectors. This implements a convolution of the image with a kernel, a basic and important class of image processing applications. The method is illustrated in FIG. 9. This figure illustrates an object 200 being imaged onto a detector plane 202 by a lens 204 after reflection from a mirror 206. Mirror 206 in this example is scanned in one direction by rotation or oscillation about an axis A perpendicular to the page. The image therefore moves on detector plane 202. Hence the particular picture element or pixel (not shown) being viewed by a given detector element in detector plane 202 varies as mirror 206 rotates to different pixel angles. By multiplying the output of the detector by a reference signal as different pixels are scanned across the detector and averaging or integrating the result, one performs a convolution of the image with a kernel that is represented by the values of the reference signal.

For example, consider a particular detector element that, in the absence of rotation of mirror 206, normally looks at a particular pixel, which is designated as the central pixel. Consider now three successive positions of mirror 206, corresponding to one pixel of the central pixel being incident successively on the detector element. If we multiply the successive signals from the detector by -1, 2, and 1, the resulting summed signal will be a representation of the second spatial derivative of the image in the direction in which the image is being scanned. In the system of FIG. 9, this same operation is performed at each different detector element, and so the output of the set of detector elements corresponds to a convolution of the image with this particular kernel, which we represent by (-1, 2, 1); a kernel that corresponds to the second spatial derivative in this particular direction.

If mirror 206 is scanned in two axes, or if one introduces a second mirror to scan in the perpendicular direction, one can perform convolutions with two-dimensional kernels. For example, now raster scanning in two dimensions and multiplying successive signals by the weights -1, -1, -1, -1, 8, -1, -1, -1, -1 will perform an approximation to the second spatial derivative in both dimensions, an operation known as taking the Laplacian of the image. Such a two dimensional kernel can be represented as:

$$\begin{bmatrix} -1 & -1 & -1 \\ -1 & 8 & -1 \\ -1 & -1 & -1 \end{bmatrix}.$$

So far the kernels and scanning operations were discussed as if they correspond to discrete steps between specific pixels, but it should also be understood that they can also be represented as continuous functions, and the scanning can be continuous rather than step-wise. Such a transition to a continuous domain does not affect the basic concept of convolution with a kernel.

Note that changing the scanning range of the mirrors effectively "dilates" the kernel; that is, one can choose to have the kernel operate very locally, with a small scanning range, or over a larger fraction of the image by using a larger scanning range. Note too that it is not necessary that the scanning be linear or at a constant rate in time. Different scanning patterns can be compensated by redesigning the reference function to compensate for the different patterns. Such scanning at non-constant rates can be advantageous. For example, in the Laplacian kernel described above, the scan can be designed to spend 8 times longer in the central pixel position than in each of the others, in which case the signal to noise ratio of the whole process could be improved because 8 times as many photons would be detected on the average in this central pixel position, in correspondence with the magnitude of the weight being applied to this position.

Various other image processing kernels can be implemented this way. Many of these are discussed in the book "The Image Processing Handbook" by John C. Russ (CRC, Boca Rotan, 1992). Examples include a sharpening operator with a kernel of the form:

$$\begin{bmatrix} 1 & 1 & 1 \\ 1 & -7 & 1 \\ 1 & 1 & -1 \end{bmatrix},$$

intended to sharpen the edges in an image while still leaving the image itself visible, and a smoothing operator of the form:

$$\begin{bmatrix} 0 & 1 & 0 \\ 1 & 4 & 1 \\ 0 & 1 & 0 \end{bmatrix},$$

that averages out local variations (versions of this kind of operator could be used for averaging out noise, or for averaging out local texture, (e.g. foliage)). Simple spatial derivative operators in one dimension are also straightforward to implement, for example with the one-dimensional kernels:

$$[1 \quad -1] \text{ and } \begin{bmatrix} 1 \\ -1 \end{bmatrix},$$

or versions in 3×3 matrix form such as:

$$\begin{bmatrix} 1 & 0 & -1 \\ 1 & 0 & -1 \\ 1 & 0 & -1 \end{bmatrix} \text{ and } \begin{bmatrix} 1 & 1 & 1 \\ 0 & 0 & 0 \\ -1 & -1 & -1 \end{bmatrix}.$$

Note that the Laplacian operator essentially represents a high-pass filter for spatial frequencies, and the smoothing operator essentially represents a low-pass filter. There are other similar operators that will perform similar functions. For example, the difference-of-Gaussian operator, which takes the difference between two different Gaussian smoothing operators of different size, also performs a high-pass filtering, and has a form similar to the Laplacian operator. Many different kernels exist that also perform local smoothing.

A yet more sophisticated concept is to use multiple different kernels that may even constitute a complete set. For example, in one direction we could apply the following set of kernels, one after the other:

[1, 1, 1, 1],

[1, 1, -1, -1],

[1, -1, -1 1],

[1, -1 1, -1].

These constitute a complete set of kernels (any 4 element kernel (or vector) can be made as a linear combination of the kernels), and can be viewed as a simple discretized Fourier transform basis (related also to a Hadamard transform basis). We can then view any particular spatial frequency filtering in terms of a weighting of the result from multiplying by these 4 basis kernels as reference functions. Of course, alternatively, we could choose that weighting in advance to construct that one kernel, though then we would lose the ability to perform subsequent filtering operations on the sequence of outputs. Various other complete sets are possible. This concept has been described for a particular case of two-dimensional kernels by, for example, W. Frei, and C. C. Chen, "Fast Boundary Detection: A generalization and a new algorithm", IEEE Trans. Comput. C-26, 988–998 (1977).

It would also be possible to construct more complex kernels designed to look for a specific shape in the image.

Use of a micromechanical array of mirrors or other devices for performing the spatial scanning separately for each pixel would permit spatial adaptation of the whole array, with different spatial scanning for different pixels. The same would be true for spectral filtering if different scanning filters were constructed for each pixel, allowing possible high level adaptation for singling out particular kinds of areas.

Note that this approach avoids conversion to a coherent signal for Fourier domain optical image processing by instead applying the same kernel to every point in the original (possible incoherent) intensity image.

Alternate Method of Scanning the Image—Rotating Risley Prisms

Risley prisms are wedges of transparent material, usually with some small angle between the two faces. A beam passing approximately perpendicularly through one of such wedges has its angle changed by a fixed amount, with the direction of the angular change depending on the rotational orientation of the wedge about an axis approximately perpendicular to the faces of the wedges. If two such prisms are put one after the other in the light beam, by changing the rotational angles of the prisms, it is possible to manipulate the angle of the beam continuously in two directions over the same range. Hence, such two so called Risley prisms can be used as an alternate method to scan the angle of a beam. They have the advantage that they can be placed "in-line", not requiring a large angle change as required by the simple mirror of FIG. 9.

Figure 10:
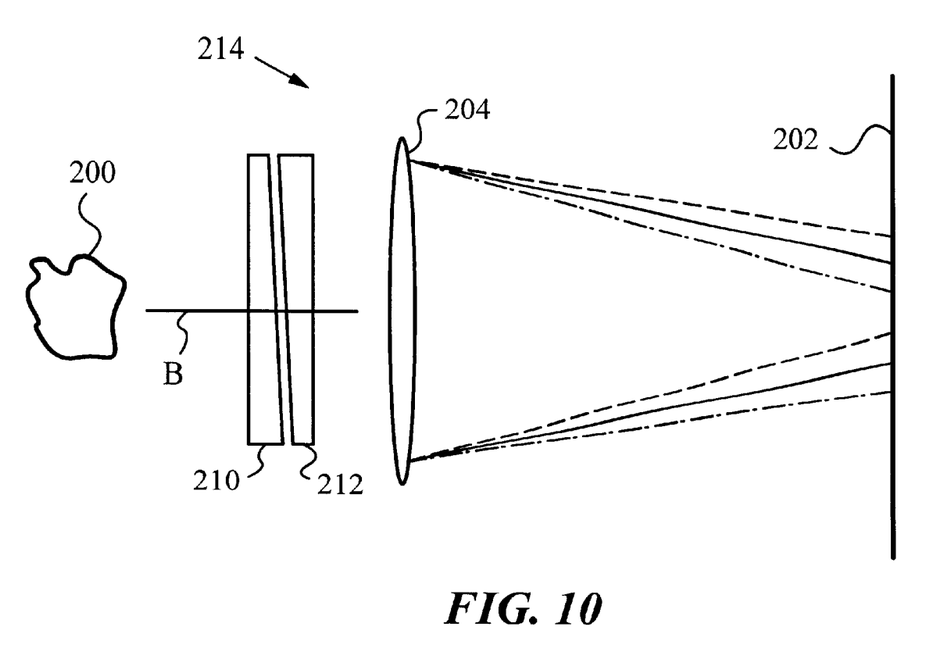
FIG. 10 shows a simplified schematic of the use of Risley prisms in an imaging system.
Figure 11:
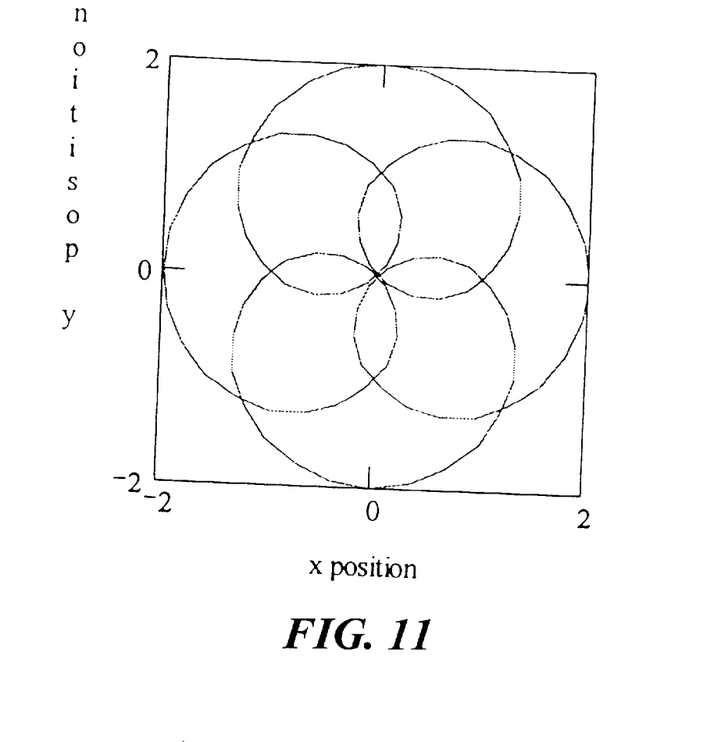
FIG. 11 is a diagram illustrating the locus of beam positions when rotating two Risley prisms of equal wedge angle, with one prism rotating 5 times as fast as the other. The units of displacement are the magnitude of the displacement the beam would experience in passing through one such prism.

FIG. 10 shows a simplified schematic of the use of Risley prisms 210 and 212 in an imaging system 214. Like parts are referred to by the same reference numbers as used in FIG. 9. Rotating one wedge 210 about an axis B approximately normal to one of the faces causes the transmitted beam position to trace out a circle. Rotating both wedges 210, 212 with fixed ratios of rotation speeds traces out curves that can be viewed as generalized forms of cycloids. FIG. 11 shows the curve traced out in angle by a beam passing through pair of Risley prisms 210, 212 of equal wedge angle, and with one prism rotation 5 times. as fast as the other.

Figure 12:
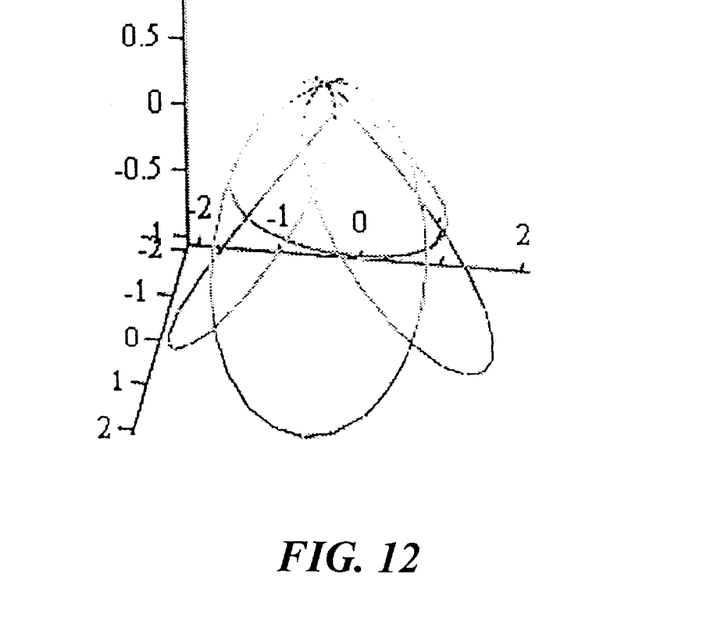
FIG. 12 is a graph of a reference function as a function of position traced out as a function of time t as two Risley prisms are rotated at rotation rates of f and 5f respectively. Both prisms have equal wedges. The value of the reference function is positive in the center and negative at the sides. The vertical axis is the amplitude of the reference function.

With such a pattern as in FIG. 11, it is possible to construct a simple reference function that will result in the approximate evaluation of a Laplacian-like operator. Choose a function −cos 8πft (where t is time) is chosen, as the reference function (i.e. a cosine at frequency 4 f) where f is the rotation rate of one prism, and 5 f is the rotation rate of the other prism. Then the value of the reference function as a function of the position in the two spatial directions is as shown in FIG. 12.

This reference function therefore weights the center of scan range strongly positive, and the wings negative, with an average value of zero. Note that the center point is accessed 4 times altogether, whereas each extreme edge point is accessed only once in the complete cycle of the system. A cycle corresponds to a time 1/f. We can therefore view this operation as being approximately equivalent to operating with the kernel $$\begin{bmatrix} 0 & -1 & 0 \\ -1 & 4 & -1 \\ 0 & -1 & 0 \end{bmatrix},$$

which is a simple version of a Laplacian operator.

Adaptive Temporal Processing

One can also take temporal derivatives by appropriate combinations of successive measurements. For example, to find the first derivative in time (the rate of change of the pixel in the image) we can multiply by the same function in two successive periods, but with opposite signs. If there is no change in the image in these two successive periods, the net average is zero. Only if there is a change is the average different from zero. Hence, we need only change the time-varying reference function to have this two-period inverted form to achieve temporal differentiation of the image.

Method of Adaptive Sensing in Multiple Modalities Combining Multiple Modalities of Adaptive Processing One power of this approach to spectral and temporal processing of image information is that all of these different aspects can be combined. Thus, for example, it is possible to look for objects with particular spectral features where the object has sharp edges and is moving. The key to this is to construct appropriate reference functions.

Figure 13:
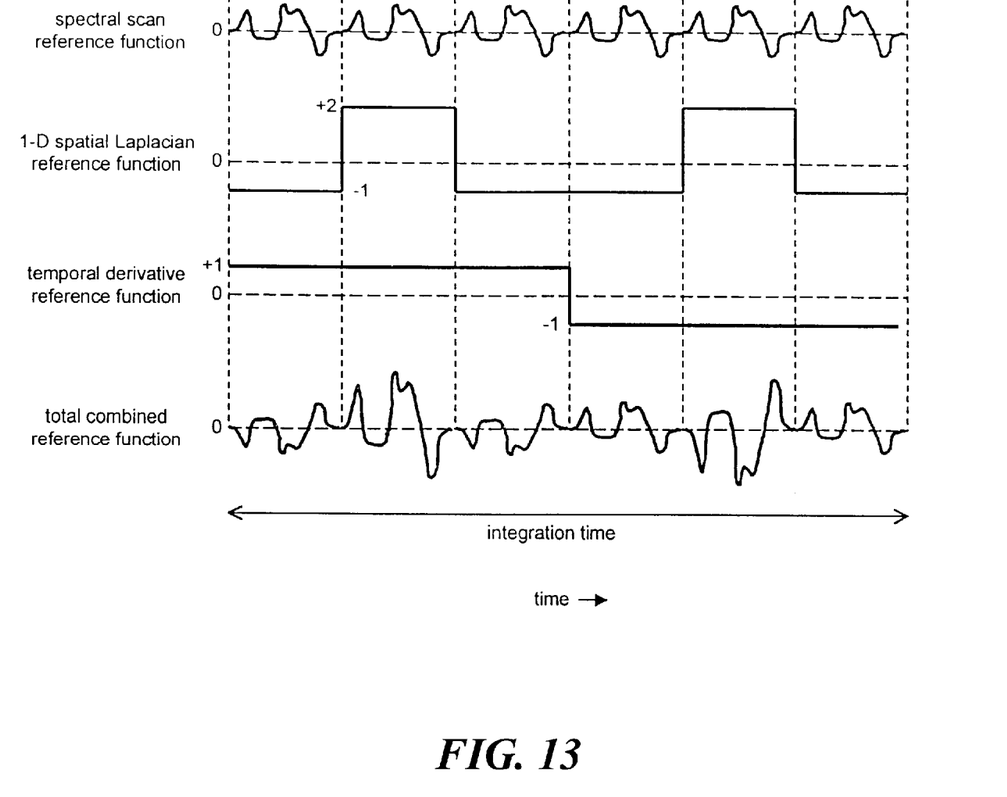
FIG. 13 is a diagram illustrating the construction of a total combined reference function by multiplication of three separate reference functions for the spectral, spatial and temporal properties desired.

The reference functions are particularly easy to construct if the different modalities (spectral scanning, spatial scanning, and temporal scanning) are run at very different scan rates that are integer multiples of one another. This is illustrated in the example of FIG. 13. In this example, the spectral scanning is performed at a relatively high scanning rate, with 6 successive spectral scans performed in the time shown in FIG. 13. Next fastest is the spatial scanning function, which in this case is chosen as a simple one-dimensional second spatial derivative (Laplacian); here the physical scan is presumed to be linear and unidirectional in time in one direction (though that is hot in general a necessary set of restrictions), so the reference function is chosen simply as the sequence of values −1, +2, −1. The slowest of the three reference functions is here chosen as the temporal derivative function, which has successive values +1 and −1, though each value persists for three periods of the spectral scan. The reference function for the spectral scan here is intended to have an average value of zero, as do the 1-D spatial Laplacian and temporal derivative reference functions. The final total combined reference function is the product of the three and also has an average value of zero. In this example, we choose to integrate over six periods of the spectral scan, so each function is integrated for a complete number of periods.

This example total reference function, when multiplied by the signal and integrated, will therefore tend to find pixels with a particular spectral signature, near an edge (so there is a strong Laplacian), and changing in time, giving large integrated signals in this case. Constant pixels, pixels in a uniform area of the image, and pixels with a spectral signature orthogonal to the spectral reference signal will all be completely rejected.

It is not absolutely necessary that the different reference signals have to be at integer ratios of frequencies, but if they are at integer ratios of frequencies, one reference function can be constructed in real time by a continuous multiplication of the multiple different reference signals.

In general, to try to find pixels with multiple attributes simultaneously, we can multiply the reference functions corresponding to the multiple attributes. To try to find pixels with one attribute or another, we can add the reference functions.

Figure 14:
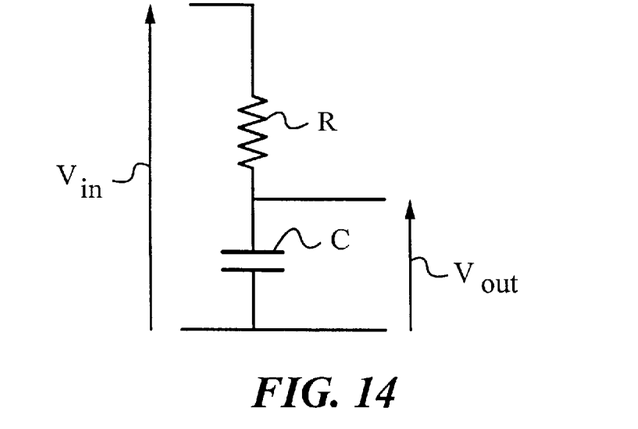
FIG. 14 is a circuit diagram of an exemplary time averaging circuit.

In the previous descriptions "Method for adaptive spectral sensing", "Additional comments on method for adaptive spectral sensing", and "Method for adaptive temporal and spatial sensing and processing", an important part of all of the methods is a mechanism (the time averaging circuit) for integrating or time-averaging the time-varying multiplied signal. There are many methods for making such a mechanism well known to those skilled in the art, including analog electrical integration or averaging circuits that return a voltage or other electrical signal, and digital schemes that would average or integrate an analog input signal after AD conversion. One of the simplest, which we mention here for completeness, is a resistor-capacitor circuit as shown in FIG. 14. This will average the input signals over a time t, in seconds of the order of the product, RC, of the resistor value, R, in ohms, and the capacitor value, C, in farads. Such an averaging time t could typically be chosen to correspond to several cycles of the time varying reference signal.

Although the present invention and its advantages have been described in detail, it should be understood that various changes, substitutions, and alternations can be made herein without departing from the principle and the scope of the invention. Accordingly, the scope of the present invention should be determined by the following claims and their legal equivalents.

What is claimed is:

1. A method of adaptive spectral sensing for a two-dimensional image comprising picture elements, said method comprising:
   a) illuminating at least one of said picture elements with an input light;
   b) deriving a time-varying spectral signal from said input light for said picture element;
   c) processing said time-varying spectral signal with a time-varying reference signal to obtain a processed output value for said picture element;
   d) employing said processed output value for determining a spectral characteristic of said input light.

2. The method of claim 1, wherein said step of deriving said time-varying spectral signal comprises optical filtering of said input light.

3. The method of claim 2, wherein said optical filtering comprises positioning an optical filter in front of said picture element.

4. The method of claim 3, wherein said optical filter is a scanning optical filter and said optical filtering comprising scanning.

5. The method of claim 3, wherein said optical filter is a Fourier transform scanning optical filter and said optical filtering comprises performing a Fourier transform.

6. The method of claim 2, wherein said time-varying spectral signal is an optical time-varying spectral signal.

7. The method of claim 2, wherein said optical filtering further comprises optically splitting said input light.

8. The method of claim 1, wherein said step of deriving said time-varying spectral signal comprises electrical control of a spectral detector element.

9. The method of claim 8, wherein said spectral detector element is selected from the group of photodetectors consisting of quantum well infrared photodetector, silicon photodetector, analog electronic multiplier.

10. The method of claim 8, wherein said time-varying spectral signal comprises an electrical time-varying spectral signal derived from said spectral detector.

11. The method of claim 10, wherein said time-varying electrical spectral signal is selected from the group consisting of voltage, current, inductance, power, electric field, magnetic field, resistance, capacitance and inductance.

12. The method of claim 10, wherein said time-varying reference signal is an electrical time-varying reference signal.

13. The method of claim 1, wherein said step of processing comprises at least one operation selected from the group of mathematical operations consisting of convolution, multiplication, averaging, integrating, forming an inner product, matched filtering, addition, subtraction and division.

14. The method of claim 1, wherein said picture element is a pixel.

15. The method of claim 1, wherein said at least one picture element comprises a number of picture elements and said step of deriving comprises deriving time-varying spectral signals for each of said number of picture elements, whereby said time-varying spectral signals are different from each other.

16. The method of claim 1, further comprising employing at least one adaptive sensing technique selected from the group consisting of adaptive spatial sensing and adaptive temporal sensing.

17. A method of adaptive spatial sensing for a two-dimensional image comprising picture elements, said method comprising:

a) illuminating at least two of said picture elements with an input light;
b) scanning a projection of said at least two picture element across a spectral detector element to obtain scan response signals from said at least two picture elements;
c) processing said scan response signals with a reference signal to obtain a processed output value for said at least two picture elements;
d) employing said processed output value for determining a spatial characteristic of said input light.

18. The method of claim 17, wherein said processed output value is a second spatial derivative of said two-dimensional image in a scanning direction.

19. The method of claim 17, wherein said reference signal is a kernel and said processing comprises convolution with said kernel.

20. The method of claim 19, wherein said kernel is selected to perform a sharpening of said two-dimensional image.

21. The method of claim 17, further comprising employing at least one adaptive sensing technique selected from the group consisting of adaptive spectral sensing and adaptive temporal sensing.

22. A method of adaptive temporal sensing for a two-dimensional image comprising picture elements, said method comprising:
a) illuminating at least one of said picture elements with an input light;
b) deriving a time-varying spectral signal from said input light for said picture element at two different points in time and averaging;
c) processing said time-varying spectral signal with a time-varying reference signal to obtain a processed output value for said picture elements;
d) employing said output value for determining a temporal characteristic of said input light.

23. The method of claim 22, further comprising employing at least one adaptive sensing technique selected from the group consisting of adaptive spectral sensing and adaptive spatial sensing.

* * * * *